Jan. 7, 1964     D. B. KAUFFELD     3,116,869
TEAR OPEN FROZEN FOOD BOX
Filed Feb. 21, 1962

INVENTOR.
DON B. KAUFFELD
BY
Alexander & Dowell
ATTORNEYS 3,116,869
TEAR OPEN FROZEN FOOD BOX
Don B. Kauffeld, Lexington, Ky., assignor to Foils
Packaging Corporation, a corporation of Ohio
Filed Feb. 21, 1962, Ser. No. 174,816
7 Claims. (Cl. 229—51)

This invention relates to a structure for paperboard boxes and to the structure of paperboard blanks from which they are made, and more particularly relates to boxes especially adapted for the packaging of frozen foods and including a novel tear-open tab providing quick and easy access to the contents.

In general, the frozen food industry is currently packaging its products in boxes which also include an inner wrapper or box liner. One of the requirements of the frozen food industry is that any container to be used in connection with their high-speed packaging machinery must be filled by access through one of the larger top or bottom surfaces, as distinguished from a side or end surface of smaller area, such top-loading being necessary because of the current practice of pre-freezing the product in the shape of a frozen block which just fits the box in which it is to be shipped and sold to the consumer.

It is therefore an important object of the present invention to provide a frozen-food box which can be easily loaded through the top of the box and which can thereafter be sealed without requiring the use of an internal mandrel to support a portion of the box while it is being sealed.

A further very important object of the invention is to provide a box having a novel tear-open structure by which the consumer can conveniently gain access to the contents of the box without the use of tools or kitchen utensils in order to break the box open.

It is another object of the present invention to provide a box structure which is especially adapted to permit heat-sealing of the box without causing damage to the product contained inside the box. The box according to this invention is preferably made from blanks having plastic-coated surfaces suitable for the application of heat-sealing techniques wherein the plastic surfaces are welded, as distinguished from glued, although the present structure can be glued if desired or assembled by using some other suitable adhesive. It is very important that the present container be inexpensive and easily set up by high-speed machinery, and that the container be designed to meet the requirements of Government food-packaging regulations. Although the present container was designed with the packaging of frozen food in mind, it is also suitable for the packaging of other products such as oils, jellies, syrups, acids, detergents, bleaches and other solid or liquid products either hot, cold or frozen, and can even be used as a pan in which to warm or bake the product therein, especially if double-foil-clad kraft material is used.

The present structure is selected as being a preferred embodiment of the invention, and utilizes many of the same features as are shown in my copending patent application Serial Number 110,818 filed May 17, 1961, now Patent No. 3,085,734 and relating to carton structures. The similarity of this package to the one set forth in the above copending application lies principally in the manner of inserton of the end panels and the sealing of the corners using flaps integrally attached to the body panels which bend inwardly to overlie the flanges on the inserted panels so as to provide a liquid-tight seal to prevent leakage of the contents. The above copending application also teaches the use of aluminum foil in connection with the laminated blanks of which the box is made, such foil quickly conducting heat away from the vicinity of heat-application during sealing of the container so as to quickly distribute and dissipate the heat to prevent damage by heat to the product packaged therein, or to prevent meltdown of the product therein in the event it is prefrozen.

I have found the heat-sealing technique used in closing containers made of a laminate having plastic surfaces provides unexpectedly favorable action in connection with the subsequent tearing-open of the sealed container by parting of heat-sealed surfaces. These plastic surfaces when properly heat sealed to each other from completely liquid-tight seals which have sufficient strength that normal handling and even dropping of the container will not cause the container to break open. However, on the other hand, this seal is not so strong that a person of average strength can not tear it open. Moreover, these plastic heat-sealed surfaces, when torn open, break clean with each other at the plastic surfaces, rather than separating or tearing the underlying laminate in an unsightly manner. In other words, the package opens neatly and efficiently with just the right amount of pull necessary to accomplish the opening. The same package when put together with rubber cement tends to hold so tightly that it can not be separated without tearing and/or separating the laminate, which results in an unsightly opening which usually becomes dampened and discolored by the products within the container. Such dampening and discoloration is particularly unappetizing to the consumer.

Another advantage in having the package open by a cleancut break is that the package can be used again as a refrigerator container by the housewife who merely clips off the torn-open panel of the package and then refills it with liquid or solid food to be stored in the refrigerator. In other words, the torn-open frozen-food box is then reusable as a container of general utility since it does not have to be destroyed in order to gain access to the product therewithin.

It is an object of this invention to provide a container which is completely sealed, but which is provided with lines of perforations along two edges of one side at which the container can be torn open, and to provide a container wherein the torn edges around the opening, after tearing-open of the container, are located some distance away from the aperture through which the food must pass while being removed from the box, or alternatively when being poured into the box when using it as a container of general utility, so that the torn edge around this opening does not tend to become wetted by the food passing through the aperture. This is accomplished by having the rows of perforations located along the exterior edges of the box and displaced from the aperture through which the food passes by the width of the flanges on the inserted top and bottom panels.

Other objects and advantages of the invention will become apparent during the following discussion of the drawings, wherein.

Figure 1:
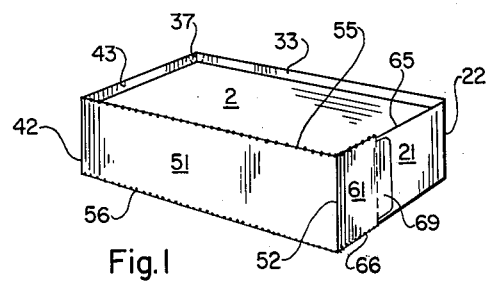
FIG. 1 is a perspective view of a finished sealed box according to the invention.
Figure 3:
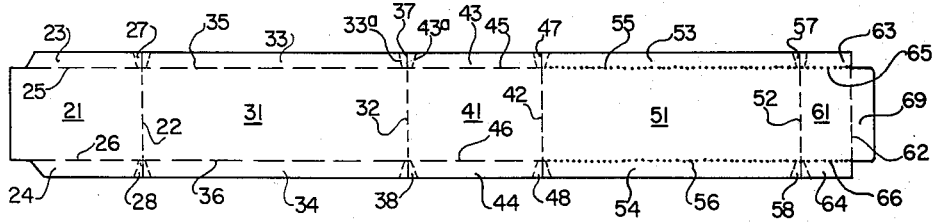
FIG. 3 is a plan view of a body blank including four side panels and a closure panel, in this and other figures of the drawing the embossed bend lines being shown as dashed lines and rows of perforations being shown as dotted lines.
Figure 6:
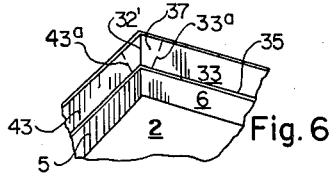
FIG. 6 is an enlarged detailed view in perspective of one corner of the box showing the top insert panel in place, but not yet sealed therein.
Figure 7:
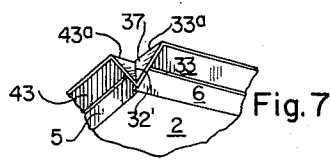
FIG. 7 is a perspective view similar to FIG. 6, but showing the corner of the body-panel end flaps being bent inwardly so that they will subsequently overlie the flanges of the top panel as shown in FIG. 1.

Referring now to FIG. 1, the practical embodiment of the box selected to illustrate the invention includes a body having four side panels 21, 31, 41 and 51, and a closure panel 61, all of these panels being integrally attached together as illustrated in FIG. 3 along embossed edge lines 22, 32, 42 and 52, these embossed edge lines when bent to form a box comprising the edge lines illustrated in FIG. 1 and designated by the same reference nuerals as FIG. 3. Each of the body side panels 21, 31, 41, 51 and 61 has upper and lower flaps, the upper flaps being represented by the reference numerals 23, 33, 43, 53 and 63 and the lower body flaps represented by the reference numerals 24, 34, 44, 54 and 64. These flaps are integrally connected with the body panels 21, 31 and 41 by transverse crease lines bearing the reference numerals 25, 35 and 45, and with the panels 51 and 61 by rows of perforations 55 and 65. Likewise, the bottom flaps are joined to the panels respectively by transverse crease lines 26, 36, and 46, and by rows of perforations 56 and 66, as can be seen best in FIG. 3. These flaps are not only integrally joined with the body panels along said transverse crease lines, but are also integrally joined together along extensions of the edge lines 22, 32, 42 and 52. However, these top and bottom flaps are also provided with diagonal crease lines which extend diagonally across the flaps and which are spaced a small distance on opposite sides of the edge lines. These diagonal crease lines are best seen in FIGS. 3, 6 and 7 and each pair thereof defines a corner-sealing tab which tabs are respectively numbered 27—37—47—57 and 28—38—48—58. In particular, FIGS. 6 and 7 clearly show the tab 37 which joins the adjacent top flaps 33 and 43 at diagonal crease lines 33a and 43a.

The body panel blank as shown in FIG. 3 also includes an embossed bend line 62 along which a pull tab 69 joins the closure panel 61, this pull tab being visible in FIGS. 1, 2, 3, 5 and 8.

Figure 4:
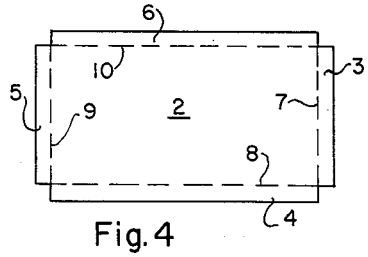
FIG. 4 is a plan view of an insert blank suitable for use either as the top or bottom of the container, the dashed lines in this view also indicating embossed bend lines.

The box is closed by upper and lower insert panels, FIG. 4, which are separate from the body panel shown in FIG. 3. Each of the insert panels, generally designated by the reference numeral 2, includes four flanges 3, 4, 5 and 6 which are respectively connected to the insert panel 2 along embossed bend lines 7, 8, 9 and 10. The corners of the flanges can either be notched out as illustrated in FIG. 4, or else a small web can be left in each corner to provide a somewhat better seal when the flanges are bent at right angles, but which also cause greater bulkiness in the corners of the box after sealing.

Figure 2:
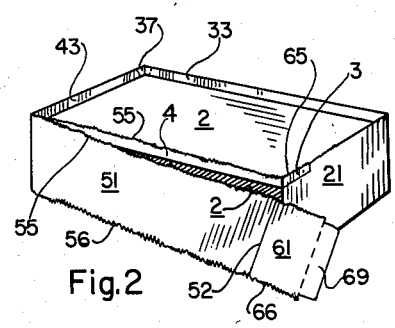
FIG. 2 is a perspective view of the box similar to the view of FIG. 1, but showing one side of the box torn open to expose its contents.
Figure 5:
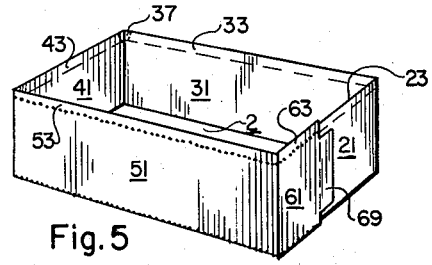
FIG. 5 is a perspective view of a partially formed box according to the present invention wherein the bottom panel has been inserted and sealed in place and the closure panel of the body blank has been lapped on one of the side panels and sealed thereto, the box standing open at the top so that it can be filled before insertion and sealing of the top panel.
Figure 8:
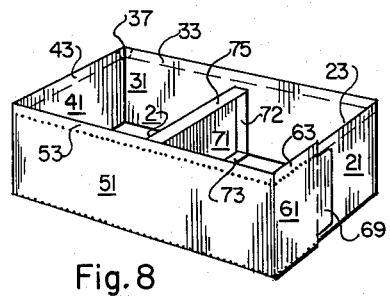
FIG. 8 is a perspective view similar to FIG. 5 but showing a box in which a transverse partition has been added to divide the box into two separate spaces, the partition being recessed below the upper edge of the side panels sufficiently to receive the top panel and abut the lower surface thereof.

The end panel 2 can be seen sealed in place in FIG. 1 and in FIG. 2 in which both the top and bottom end panels can be seen, but in FIGS. 5 and 8 only the bottom panel is shown since the top panel has not yet been inserted. Each insert panel 2 is entered in the open top or bottom of the box with its flanges 3, 4, 5 and 6 bent at right angles and facing outwardly. For instance, when the top panel is inserted in this manner, the outer edges of the flanges lie within the body panels just even with the transverse crease lines, i.e. the edge of flange 4 lies even with the line of perforations 55, the edge of flange 5 lies even with the transverse crease line 45, the edge of flange 6 lies even with the transverse crease line 35, and the edge of flange 3 lies even with the transverse crease line 25, as is best illustrated in FIGS. 6 and 7. After the insert panel 2 is set in place, the flaps 23, 33, 43, 53 and 63 are bent substantially 180 degrees inwardly of the box so as to overlie the flanges 3, 6, 5 and 4. However, as an alternative method of sealing, when the panel 2 is placed in the filled box as shown in FIG. 6, the flanges 3, 4, 5 and 6 may be heat-sealed to the side panels below crease lines 25, 35, 45 and 55 to hold the panel 2 in place before the flaps 23, 33, 43 and 53 are bent over the flanges of the panel 2 and heat-sealed thereon. The bottom insert panel 2 is also put in place in the same manner with the flanges extending outwardly of the box and covered by the lower end flaps 24, 34, 44, 54 and 64.

As fully described in the above-mentioned copending application, the flaps are folded inwardly to overlie the flanges by first folding the corner tabs, such as the tab 37 shown in FIGS. 6 and 7, inwardly as shown in FIG. 7 in order to start the flaps located thereadjacent so that they being to go through the 180-degree bend necessary to cover the flange flaps. The tab 37 and the adjacent flaps 43 and 33 are finally fully folded inwardly as shown in FIG. 1 and accurately located with the center line 32' exactly coinciding with the intersection of the flanges 5 and 6.

In setting up the box illustrated in the drawings, the body is first bent around the edge lines 22, 32, 42 and 52, and the closure panel 61 is lapped on top of the side panel 21 and is sealed thereto. Then, the bottom insert panel 2 is entered in the bottom of the box with its flanges 3, 4, 5 and 6 facing outwardly and the bottom flaps 24, 34, 44, 54 and 64 are bent inwardly to cover these flanges. Finally, the flaps and flanges are sealed together either by using heat-sealing or some other suitable adhesive.

At this point, if desired a partition panel 71, FIG. 8, can be inserted to divide the box in half either lengthwise or crosswise, or in such other proportion as may be desired, and three of the flanges 72, 73 and 74 (not shown) are sealed to the panels 31, 2 and 51. The remaining flange 75 remains unbent in the plane of the partition while the latter is being sealed in place by a suitable split mandrel straddling the partition and also abutting the bottom panel 2, and after sealing of the partition in place, the remaining flange 75 is bent over horizontally to lie parallel with the bottom panel 2 and at such a level that the top panel 2 when inserted will lie tight against it. When setting up the container to the extent shown in FIG. 8, a split mandrel is used which has a slot in it which can straddle the partition panel 71 and serve as a backing for the bottom panel 2 and the side panels as well as the partition panel 71 while all of these panels are being sealed in place, preferably simultaneously.

When the box has been set up to this extent, it is then filled and the top panel 2 is put in place with its flanges 3, 4, 5 and 6 extending upwardly and even with the transverse crease lines 25, 35, 45, 55 and 65. The top flaps 23, 33, 43, 53 and 63 are then bent inwardly to cover the upper flanges 3, 4, 5 and 6 and are sealed thereto in the same manner as the bottom panel was sealed in place. This forms a finished container as shown in FIG. 1.

The pull tab 69 is not sealed to the panel 21 but is left loose so that a person can insert a fingernail between the panel 21 and the pull tab 69 and bend it outwardly around the embossed bend line 62 so that a good grip can be had on the pull tab in order to tear the box open in the manner illustrated in FIG. 2. Note that when torn open the box tears along the line of perforations 55—65 and 56—66, and that these perforations are spaced away from the resulting aperture in the side of the box and from its contents by the height of the flange 4 in FIG. 2 both at the top and the bottom of the aperture. Thus, the tearing-open of the box leaves raw cardboard edges which are spaced away from its contents and do not tend to be wetted and discolored thereby. Also, as stated above, the use of heat-sealing as distinguished from gluing makes it relatively easy to break the panel 51 away from the flange 4 since the heat-sealing breaks more easily than glue would break at this point. I intend to cover both the type of structure in which the panel 51 is sealed to the flange 4 as well as the structure in which the two touch each other but are not sealed together because of the fact that the mandrel placed against the panel 51 during heat-sealing of the flap 53 to the flange 4 was cool and only the mandrel placed against the flange 53 was heated.

Figure 9:
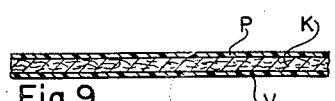
FIG. 9 is an enlarged cross-sectional view showing one form of laminated material from which the blanks and the box shown in the other figures may be made.

Referring now to FIG. 9, this figure shows on an enlarged scale a laminated material suitable for making the present blanks and containers. This material comprises a core of kraft K coated on both sides with plastic. This plastic should be a heat-sealable material such as polyethylene P, at least on the inner surface of the container, and for the sake of appearance the outer surface of the container should also be coated with a plastic material which may be polyethylene or which alternatively may comprise some other coating, such as vinyl V, it merely being necessary that the outer coating V will bond to the polyethylene P of the inner coating when heat is applied thereto so that the box may be heat-sealed by the above-mentioned steps which closely resemble welding. It is also contemplated that the laminate may comprise other cores than the kraft core referred to above.

Figure 10:
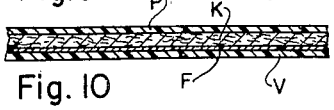
FIG. 10 is an enlarged cross-sectional view showing another form of laminated material also suitable for use in making the blanks and containers of the present invention.

FIG. 10 is similar to FIG. 9 except that a metal foil F is interposed between the outer plastic coating V and the inner core K for the sake of dissipating heat from the vicinity of an area being heat-sealed so as to prevent the heat in that area from reaching the contents of the container with such intensity that the contents are melted down and therefore damaged. This foil F can be laminated to the kraft core by any suitable material, such as waterbase latex, or even a fusible plastic adhesive. This disclosure is not to be limited, however, to any particular adhesive, and as stated above, it is only necessary that at least one of the plastics be a weldable type which can be sealed at a temperature low enough that the kraft K will not be damaged by the heat applied. Although the cross-sectional shape of the container illustrated in the drawing is rectangular it is to be understood that my invention is not to be limited to this shape, and that another polygonal shape, such as triangular, square, hexagonal, etc. may be used as desired.

I do not limit my invention to the exact form shown in the drawing, for changes may obviously be made within the scope of the following claims.

I claim:

1. A box comprising a polygonal body including a plurality of side panels mutually joined together, and one side panel having a closure panel which overlaps an adjacent side panel and is secured thereto, and the side panels having flaps around their upper and lower edges; insert panels for closing the upper and lower ends of the body and each having flange flaps around the periphery bent to face outwardly of the box when the insert panels are inserted in the body, the body flaps being bent substantially 180 degrees with respect to the body panels to form outer edges of the box, and said flaps overlapping and covering said flange flaps; and the body flaps on said one side panel being joined to the latter panel along lines of perforations extending along the outer edges of the box to facilitate tearing said latter panels away from the box along said lines whereby the torn edges at the perforations are offset from the resulting aperture in the side of the box by the height of a flange flap.

2. In a box as set forth in claim 1, said closure panel having a pull tab attached thereto along an edge parallel to the intersection of the closure panel and said one side panel, and the closure tab extending substantially from one line of perforations to the other.

3. In a box as set forth in claim 1, a partition in the box having flanges bent normal to the partition and abutting the insert panels and two of the body side panels and secured to at least some of these panels.

4. A box made of sheet material having surfaces of heat-sealable plastic comprising a polygonal body including a plurality of side panels mutually joined together, and one side panel having a closure panel which overlaps an adjacent side panel and is heat-sealed thereto, and the side panels having flaps around their upper and lower edges; insert panels for closing the upper and lower ends of the body and each having flange flaps around its periphery bent to face outwardly of the box when the insert panels are inserted in the body, the body flaps being bent substantially 180 degrees with respect to the body panels to form outer edges of the box, and said flaps overlapping the flange flaps and being heat-sealed thereto; and the body flaps on said one side panel being joined to the latter panel along lines of perforations extending along the outer edges of the box to facilitate tearing of said latter panels away from the box along said lines whereby the torn edges at the perforations are offset from the resulting aperture in the side of the box by the height of a flange flap.

5. In a box as set forth in claim 4, the body panels and the closure panel being heat-sealed to the flange flaps of the insert panels.

6. In a box as set forth in claim 4, said closure panel having a pull tab attached thereto along an edge parallel to the intersection of the closure panel and said one side panel, and the closure tab extending substantially from one line of perforations to the other.

7. In a box as set forth in claim 4, a partition in the box having flanges bent normal to the partition and abutting the insert panels and two of the body side panels and secured to at least some of these panels.

References Cited in the file of this patent

UNITED STATES PATENTS

| | | |
|---|---|---|
| 2,283,046 | Clouston | May 12, 1942 |
| 2,475,107 | Newsom | July 5, 1949 |
| 2,665,616 | Jungmayr | Jan. 12, 1954 |
| 2,737,337 | Moore | Mar. 6, 1956 |
| 3,029,997 | Kauffeld | Apr. 17, 1962 |